(12) United States Patent
Hiros et al.

(10) Patent No.: US 8,419,375 B2
(45) Date of Patent: Apr. 16, 2013

(54) METHOD OF MAKING A ROTOR YOKE AND ROTOR YOKE THEREOF

(75) Inventors: Tricia L. Hiros, Haltom City, TX (US); Frank Bradley Stamps, Colleyville, TX (US); Pat Tisdale, Roanoke, TX (US); Ron Measom, Hurst, TX (US); Jim Braswell, Colleyville, TX (US); Tom Campbell, Keller, TX (US); Paul K. Oldroyd, Azle, TX (US); Richard Barbour, North Richlands Hills, TX (US)

(73) Assignee: Textron Innovations Inc., Providence, RI (US)

( * ) Notice: Subject to any disclaimer, the term of this patent is extended or adjusted under 35 U.S.C. 154(b) by 241 days.

(21) Appl. No.: 12/864,704

(22) PCT Filed: Jan. 31, 2008

(86) PCT No.: PCT/US2008/052546
§ 371 (c)(1),
(2), (4) Date: Jul. 27, 2010

(87) PCT Pub. No.: WO2009/096964
PCT Pub. Date: Aug. 6, 2009

(65) Prior Publication Data
US 2011/0116936 A1    May 19, 2011

(51) Int. Cl.
*B64C 11/14* (2006.01)
*B64C 27/32* (2006.01)

(52) U.S. Cl.
USPC .................................. 416/244 R; 416/134 A

(58) Field of Classification Search .............. 416/134 A, 416/244 R; *B63H 7/00, 7/02; B64C 11/00, B64C 11/14, 27/00, 27/32*
See application file for complete search history.

(56) References Cited

U.S. PATENT DOCUMENTS

| 4,293,276 A | 10/1981 | Brogdon et al. |
| 4,332,525 A * | 6/1982 | Cheney, Jr. ............... 416/134 A |

(Continued)

FOREIGN PATENT DOCUMENTS

| WO | 2007106064 A2 | 9/2007 |
| WO | WO 2007106064 A2 * | 9/2007 |

OTHER PUBLICATIONS

Supplementary European Search Report from the European Patent Office in related European Patent Application No. 08728622, issued Oct. 18, 2012, 5 pages.
Office Action from the Chinese Patent Office in related Chinese Patent Application No. 200880126054, issued Sep. 13, 2012, 10 pages.

(Continued)

*Primary Examiner* — Tran Nguyen
*Assistant Examiner* — Michael Andrews
(74) *Attorney, Agent, or Firm* — James E. Walton; J. Oliver Williams

(57) ABSTRACT

A method of making a rotor yoke includes preparing a cured composite rotor yoke preform on a single-sided curing tool and machining at least one portion of the cured rotor yoke preform to form a rotor yoke. In one embodiment, preparing the cured composite rotor yoke is accomplished by applying successive layers of uncured polymeric composite material to a single-sided tool in a configuration to produce an uncured rotor yoke preform; disposing a semi-rigid caul to an untooled side of the uncured rotor yoke preform; enclosing the uncured rotor yoke preform and the semi-rigid caul by substantially hermetically sealing a vacuum bag to the tool; substantially evacuating a volume defined by the vacuum bag and the tool of air; and heating the uncured rotor yoke preform, sometimes under pressure, to form the cured composite rotor yoke preform.

12 Claims, 4 Drawing Sheets

U.S. PATENT DOCUMENTS

| | | | | |
|---|---|---|---|---|
| 5,123,985 | A | * | 6/1992 | Evans et al. ............... 156/213 |
| 5,242,523 | A | | 9/1993 | Willden et al. |
| 6,723,272 | B2 | * | 4/2004 | Montague et al. ............ 264/510 |
| 2005/0079056 | A1 | * | 4/2005 | Welsh .......................... 416/145 |

OTHER PUBLICATIONS

Office Action from the Canadian Patent Office in related Canadian Patent Application No. 2,712,638, issued Dec. 3, 2012, 2 pages.

* cited by examiner

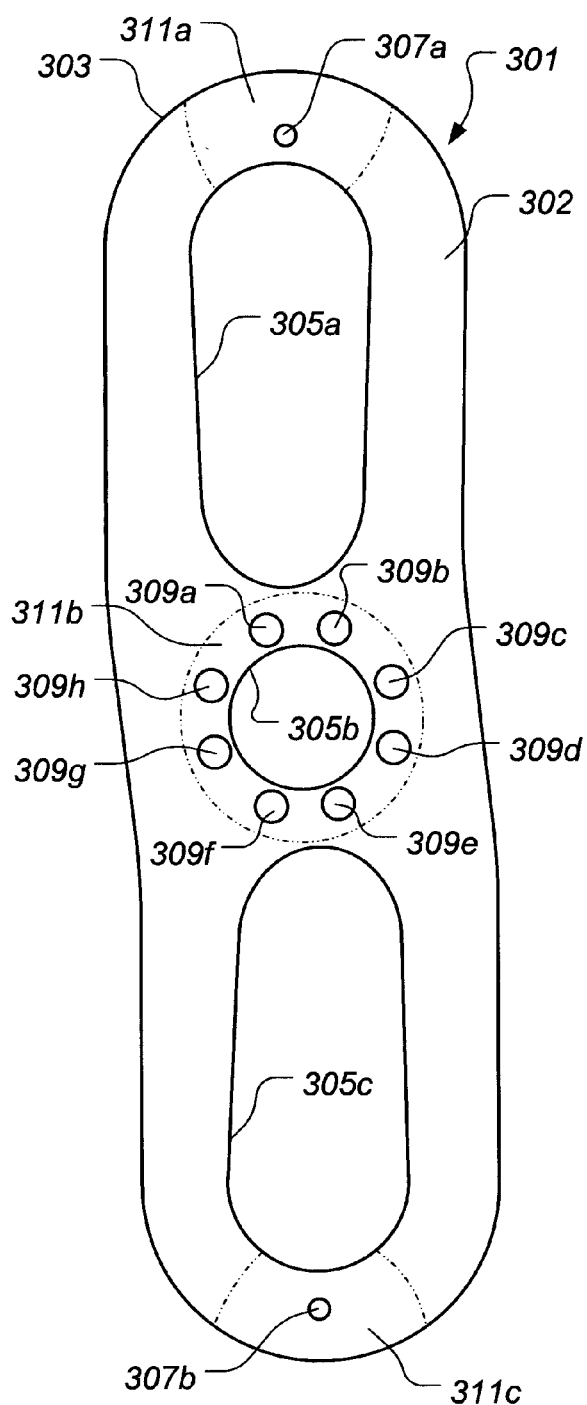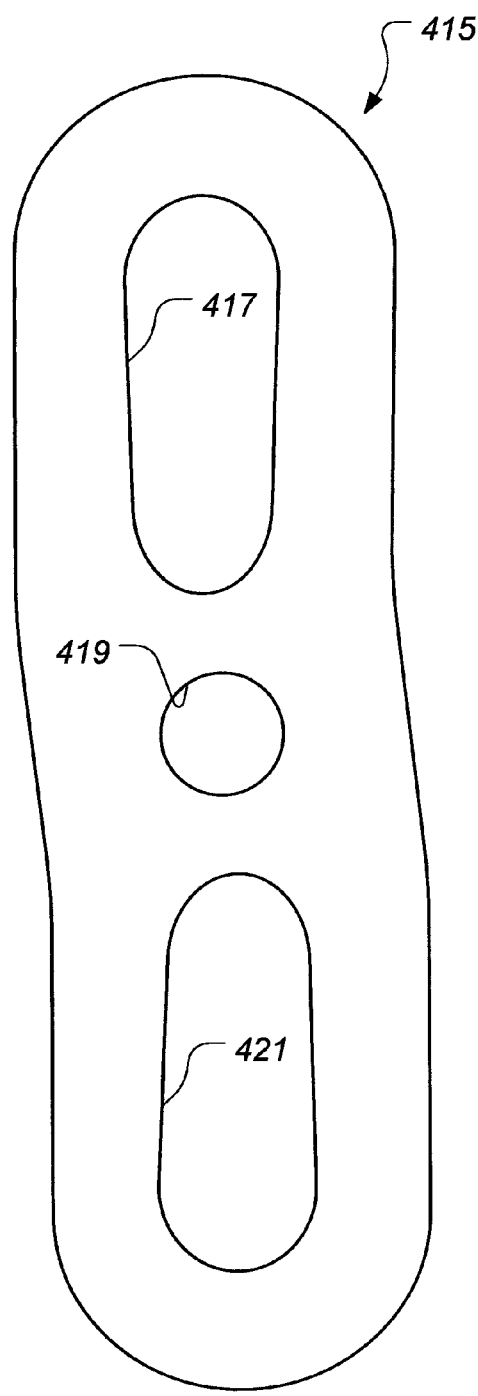
FIG. 3
FIG. 6

METHOD OF MAKING A ROTOR YOKE AND ROTOR YOKE THEREOF

TECHNICAL FIELD

The present invention relates to rotorcraft and, in particular, to yokes for coupling helicopter blades to a mast.

DESCRIPTION OF THE PRIOR ART

Each blade of the main rotor assembly of a rotorcraft must be connected to a main support mast, usually by means of a rotor yoke, in a manner allowing several degrees of freedom. Such an interconnection is subjected to high and repeated stresses of both torsional and centrifugal natures, and is therefore an extremely important component of the aircraft. Each blade must be able to rotate about its longitudinal axis to provide pitch control. Each blade must be able to flap in a direction perpendicular to the rotor plane to accommodate vertical loads. In some instances, each blade must be able to pivot within the rotor plane to provide for lead-lag control. The manner in which the blades are secured to the main support mast enables a rotorcraft to be controlled and maneuvered in flight.

Various types of rotor yokes have been utilized to interconnect the rotorcraft blades and the support mast. Metal rotor yokes have suffered from the disadvantages of weight, cost, high maintenance requirements, and low useful life. There have been several attempts to eliminate one or more of the articulations in such couplings in order to simplify construction and reduce costs. Some rotor yokes are pivotally secured to the support mast, and are characterized by a flat plate construction resilient enough to act as a virtual hinge and thereby accommodate flapping of the blades.

More recently, glass fibers and other composite materials have been employed in the fabrication of rotorcraft rotor system components. In comparison to a machined metal forging, glass fibers and other composite materials have more favorable fatigue characteristics resulting in longer useful life. In addition, the use of such materials simplifies construction and reduces costs. Referring to FIGS. 1 and 2, such composite rotor yokes, such as a rotor yoke 101 are conventionally cured in a rigid, closed mold, such as mold 103, to form the overall shape of the rotor yoke. One of the problems encountered concerning such rotorcraft rotor yokes, however, has been distortion or "marcelling" of the fibers in the rotor yoke during the curing process. Because the uncured rotor yoke is forced to conform to the cavity, such as cavity 105, formed by the closed mold, mechanical stresses are induced in the uncured rotor yoke. The fibers are substantially unconstrained during certain portions of the curing cycle when the resin matrix in which the fibers are disposed is in a semi-liquid or liquid state. The induced stress in the uncured rotor yoke is relieved via movement or distortion of the fibers within the resin matrix. The fibers are captured in their distorted or marcelled state when the resin crosslinks in thermosetting composite materials or when the resin is cooled in thermoplastic composite materials.

There are many designs of rotorcraft yokes well known in the art; however, considerable shortcomings remain.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

FIG. 3 is a top, plan view of an illustrative embodiment of a fiber-reinforced, polymeric-matrix, composite rotor yoke;

FIG. 6 is a top, plan view of an illustrative embodiment of a composite rotor yoke preform corresponding to the composite rotor yoke of FIG. 3;

Figure 1:
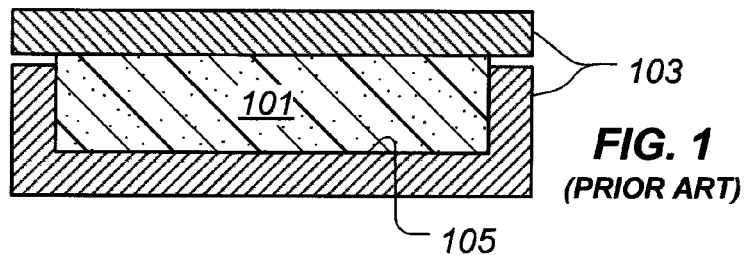
FIGS. 1 and 2 are stylized, cross-sectional views illustrating a conventional method for manufacturing a composite rotor yoke for a rotorcraft.
Figure 2:
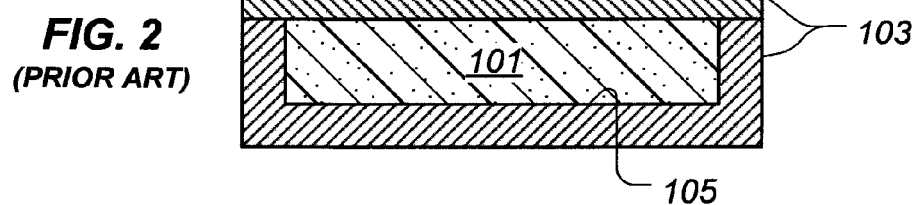

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention represents a composite rotor yoke for a rotorcraft produced using a single-sided, rigid, curing tool. Preferably, the composite rotor yoke is laid-up using an automated fiber placement process. After curing, the cured composite rotor yoke is machined to final shape including, in some embodiments, faying surfaces of the composite rotor yoke.

FIG. 3 depicts an illustrative embodiment of a rotorcraft rotor yoke 301. Rotor yoke 301 comprises a polymeric-matrix composite body 302, made from materials such as glass fibers disposed in an epoxy matrix, although the present invention contemplates other materials for rotor yoke 301. Outer periphery 303 of rotor yoke 301 and inner peripheries 305a-305c of rotor yoke 301 are machined to final dimensions. Moreover, openings 307a and 307b that are used in attaching rotor blades, such as rotor blades 701a-701d of FIG. 7, to rotor yoke 301 are machined openings, as are mast attachment openings 309a-309h. Faying surfaces, such as faying surfaces 311a-311c, which are shown bordered in phantom in FIG. 3, are also machined surfaces in certain embodiments of rotor yoke 301. Thus, rotor yoke 301 defines a machined outer periphery, such as outer periphery 303; machined inner peripheries, such as inner peripheries 305a-c; machined openings, such as openings 307a, 307b and 309a-309h; and/or machined faying surfaces, such as faying surfaces 311a-311c.

For the purposes of this disclosure, the term "machined" means generated using a rotating cutting tool having cutting features, such as teeth, abrasive particles, and the like, that incrementally remove material from rotor yoke 301 as the cutting tool is traversed along rotor yoke 301. Moreover, the term "faying surface," for the purposes of this disclosure, means a surface of an element that will be in contact with another component when the element is attached or joined to the other component.

It should be noted that the particular geometric configuration of rotor yoke 301 is merely exemplary of the geometric configurations contemplated by the present invention, as the particular geometric configuration of a rotor yoke is implementation specific.

Figure 4:
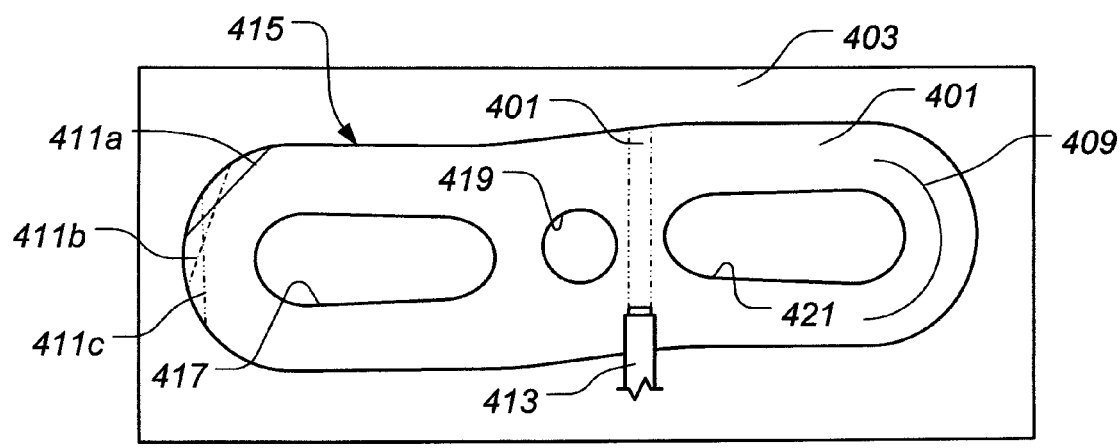
FIG. 4 is a stylized side, elevational view depicting a portion of an illustrative method for making the composite rotor yoke of FIG. 3.

Referring to FIG. 4 in the drawings, a composite rotor yoke preform 415 of rotor yoke 301 (shown in FIG. 3) is fabricated by applying successive layers of uncured polymeric composite material 401 onto a single-sided tool 403. Note that the geometric configuration of tool 403 is merely exemplary of the widely diverse geometric configurations of single-sided tools contemplated by the present invention. In one embodiment, fibers of composite material 401 extend substantially continuously around loops 405 and through blade-attachment areas or lugs 407 of preform 415, and thus rotor yoke 301, as represented by a line 409. Alternatively, in another embodiment, fibers of composite material 401 extend substantially linearly across portions of preform 415, and thus rotor yoke 301, but along different angular paths in successive layers to form faceted, straight fiber plies in preform 415, and thus rotor yoke 301, as represented by lines 411a-411c. Preferably, composite material 401 is applied to tool 403 using an automated fiber placement machine, such as an automated fiber placement machine 413.

Uncured, composite rotor yoke preform 415 is formed when the desired number of plies or layers of composite material 401 have been applied to tool 403 in the desired geometry. It should be noted that, in one embodiment, rotor yoke preform 415 is oversized, i.e., is larger in physical dimensions than rotor yoke 301. For example, the outside dimensions of rotor yoke preform 415 is larger than the desired outside dimensions of rotor yoke 301 to provide material that is removed during the machining process to form machined outer periphery 303 (shown in FIG. 3). Moreover, dimensions of openings 417, 419, and 421 are smaller than corresponding openings defined by inner peripheries 305a-305c of rotor yoke 301 to provide material that is removed during the machining process to form inner peripheries 305a-305c. In other embodiments, however, a preform such as preform 415 is formed to produce a substantially net shape rotor yoke 301, as is discussed herein with respect to FIG. 8.

Figure 5:
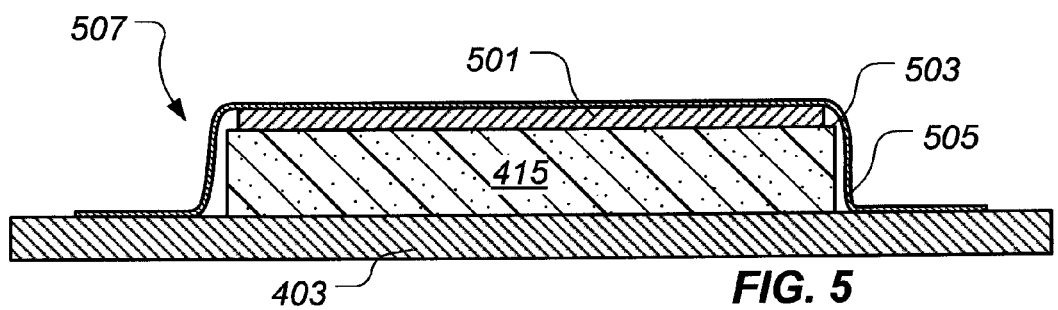
FIG. 5 is a stylized, cross-sectional view depicting an illustrative curing assembly including a preform of the composite rotor yoke of FIG. 3.

Referring now to FIG. 5, to prepare rotor yoke preform 415 for curing, a semi-rigid caul 501 is placed on an untooled side 503 of rotor yoke preform 415. Caul 501 preferably exhibits non-isotropic mechanical properties that, along with the shape of caul 501, is tailored to fit an outside shape of rotor yoke preform 415. A substantially airtight sheet, referred to herein as a "vacuum bag" 505, is disposed over caul 501 and rotor yoke preform 415, such that vacuum bag 505 is substantially hermetically sealed to tool 403, forming a curing assembly 507. Other materials, such as breather materials, release films, and the like, may be used as is known to the art. Air between caul 501, rotor yoke preform 415, tool 403 and vacuum bag 505 is substantially evacuated and a negative pressure is maintained within vacuum bag 505 with respect to atmosphere. Curing assembly 507 is subjected to heat and, in some embodiments, pressure, to consolidate and cure rotor yoke preform 415.

Referring to FIGS. 3 and 6, when the cured, rotor yoke preform 415 is removed from vacuum bag 505, caul 501, and tool 403, the cured rotor yoke preform 415 is ready to be machined. Material defining openings 417, 419, and 421 is machined away from cured rotor yoke preform 415 to form inner peripheries 305a-305c. Material is also machined away cured rotor yoke preform 415 to form outer periphery 303 and faying surfaces 311a-311c. Openings 307a, 307b, and 309a-309h are machined, preferably using a five-axis machine tool, into cured rotor yoke preform 415. Rotor yoke 301 is formed when all machining operations are complete.

Figure 7:
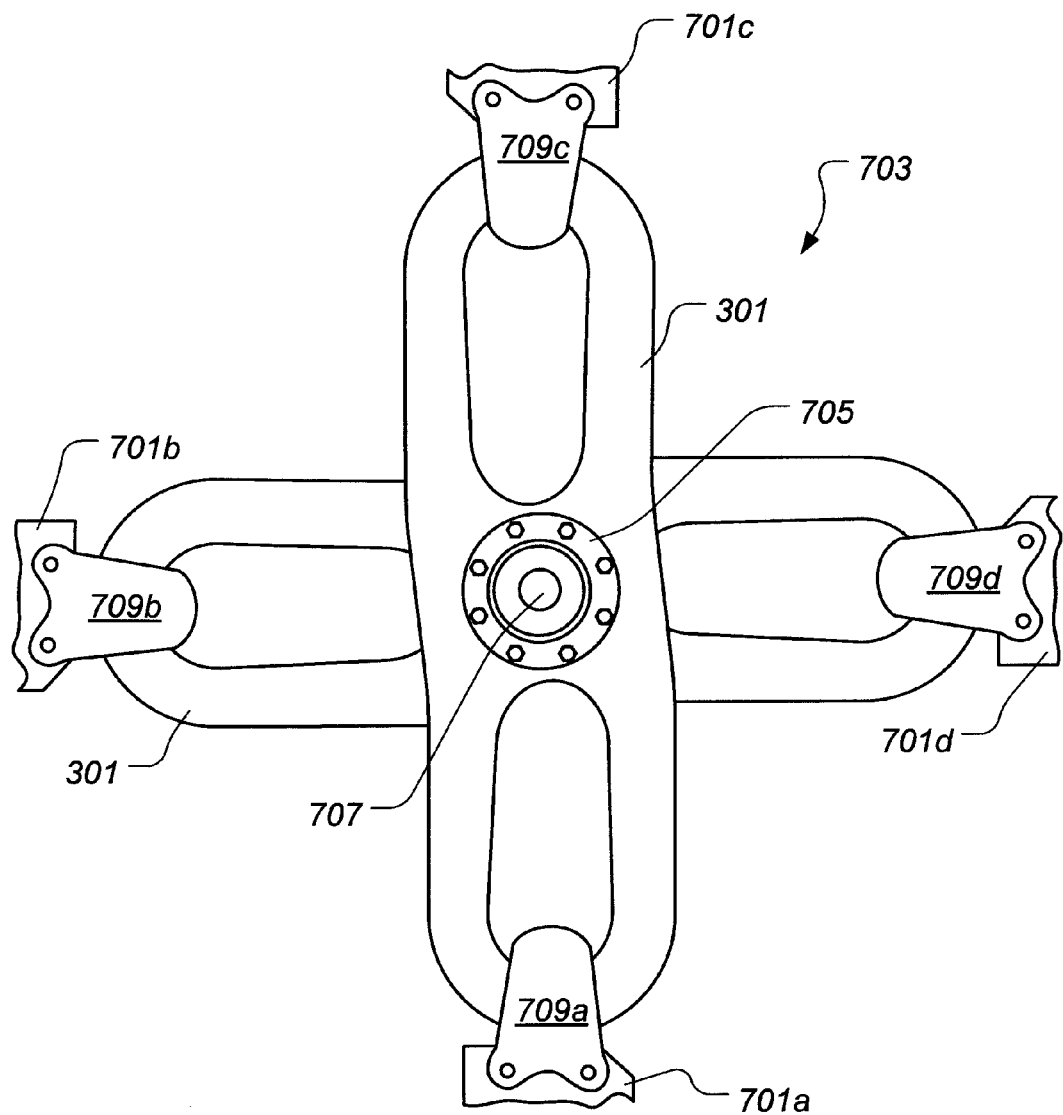
FIG. 7 is a top, plan view of an illustrative embodiment of a rotor hub incorporating a pair of composite rotor yokes of FIG. 3.

FIG. 7 depicts a rotor hub 703 comprising, in the illustrated embodiment, a pair of rotor yokes 301, a coupling 705 that mechanically couples rotor yokes 301 to a mast 707, and fittings 709a-709d that mechanically couple rotor yokes 301 to rotor blades 701a-701d, respectively. The configuration of rotor hub 703 depicted in FIG. 7 is merely exemplary of the widely various embodiments of a rotor hub contemplated by the present invention.

Figure 8:
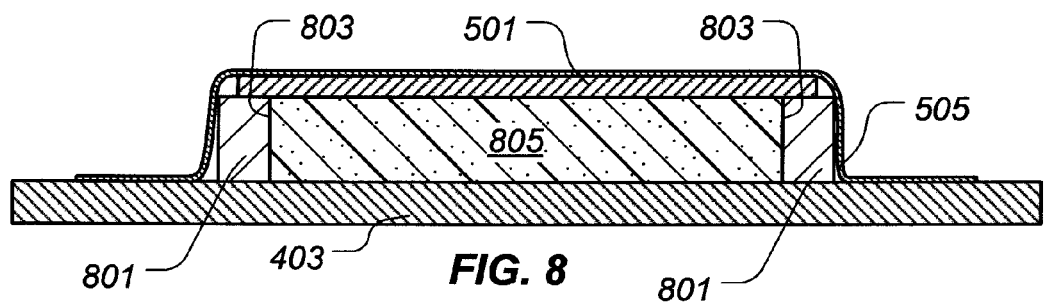
FIG. 8 is a stylized, cross-sectional view depicting an illustrative curing assembly, alternative to the curing assembly of FIG. 5.

As discussed herein, a preform for rotor yoke 301 is prepared in substantially a net shape form, rather than in the oversized form described in relation to preform 415 of FIG. 4. In such an embodiment, as shown in FIG. 8, one or more dams 801 are disposed under caul 501 and vacuum bag 505 adjacent to edges 803 of an uncured preform 805. Other materials, such as breather materials, release films, and the like, may be used as is known to the art. During the curing process, such as described in relation to FIG. 5, the one or more dams 801 confine preform 805 to define the edges of rotor yoke 301.

The present invention provides significant advantages, including: (1) providing a composite rotor yoke that exhibits less marcelling of the reinforcing fibers thereof; (2) providing a method of producing a composite rotor yoke that inhibits voids in the composite rotor yoke; (3) enabling the use of toughened, low-flow resins in composite rotor yokes; and (4) providing a composite rotor yoke that requires less composite fabrication time, cost, and effort with less part-to-part variation than conventional rotor yokes.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A method of making a rotor yoke, comprising:
   preparing a cured composite rotor yoke preform on a single-sided curing tool; and
   machining at least one portion of the cured rotor yoke preform to form a rotor yoke;
   wherein preparing the cured composite rotor yoke is accomplished by:
      applying successive layers of uncured polymeric composite material to a single-sided tool in a configuration to produce an uncured rotor yoke preform;
      disposing a semi-rigid caul to an untooled side of the uncured rotor yoke preform, the semi-rigid caul having non-isotropic properties to selectively tailor the rotor yoke preform;
      enclosing the uncured rotor yoke preform and the semi-rigid caul by substantially hermetically sealing a vacuum bag to the tool;
      substantially evacuating a volume defined by the vacuum bag and the tool of air; and
      heating the uncured rotor yoke preform to form the cured composite rotor yoke preform.

2. The method, according to claim 1, further comprising:
   pressurizing the uncured rotor yoke preform while heating the uncured rotor yoke preform.

3. The method, according to claim 1, wherein applying the successive layers of uncured polymeric composite material is accomplished by an automated fiber placement process.

4. The method, according to claim 1, wherein preparing the cured composite rotor yoke is further accomplished by:
   placing one or more dams adjacent one or more edges of the uncured rotor yoke preform so as to define the edges of the uncured rotor yoke preform.

5. The method, according to claim 1, wherein machining at least one portion of the cured rotor yoke is accomplished by machining the cured rotor yoke preform to form an outer periphery of the rotor yoke.

6. The method, according to claim 1, wherein machining at least one portion of the cured rotor yoke is accomplished by machining the cured rotor yoke preform to form an inner periphery of the rotor yoke.

7. The method, according to claim 1, wherein machining at least one portion of the cured rotor yoke is accomplished by machining the cured rotor yoke preform to form a faying surface of the rotor yoke.

8. The method, according to claim 1, wherein machining at least one portion of the cured rotor yoke is accomplished using a five-axis machine tool.

9. A rotor yoke, comprising:
   a polymeric composite body defining at least one machined surface, the polymeric composite body having been formed on a single-sided curing tool and with a semi-rigid caul plate having non-isotropic properties in order to selectively tailor the rotor yoke preform.

10. The rotor yoke, according to claim 9, wherein the at least one machined surface comprises:
    a machined outer periphery.

11. The rotor yoke, according to claim 9, wherein the at least one machined surface comprises:
    a machined inner periphery.

12. The rotor yoke, according to claim 9, wherein the at least one machined surface comprises:
    a faying surface.

* * * * *